United States Patent [19]

Bauer et al.

[11] Patent Number: 4,806,026
[45] Date of Patent: Feb. 21, 1989

[54] SEAL FOR BEARING BUSHINGS

[75] Inventors: Bernhard Bauer, Hassfurt; Herbert Dobhan, Bergrheinfeld, both of Fed. Rep. of Germany

[73] Assignee: SKF GmbH, Fed. Rep. of Germany

[21] Appl. No.: 178,618

[22] Filed: Apr. 7, 1988

[30] Foreign Application Priority Data

Apr. 9, 1987 [DE] Fed. Rep. of Germany ... 8705291[U]

[51] Int. Cl.$^4$ .............................................. F16C 33/78
[52] U.S. Cl. ...................................... 384/486; 277/152
[58] Field of Search ............... 384/486, 484, 147, 148; 277/152, 166, 153, 35, 45, 46, 47, 48, 49, 50

[56] References Cited

U.S. PATENT DOCUMENTS

| | | | |
|---|---|---|---|
| 4,512,672 | 4/1985 | Olschewski et al. | 384/486 |
| 4,576,382 | 3/1986 | Scharting et al. | 277/152 |
| 4,614,446 | 9/1986 | Dreschmann et al. | 384/484 |
| 4,674,755 | 6/1987 | Colanzi et al. | 384/486 |

Primary Examiner—Lenard A. Footland
Attorney, Agent, or Firm—Eugene E. Renz, Jr.

[57] ABSTRACT

A seal for bearing bushing with a sealing ring in a bore of the bearing bushing having a sealing surface which rests against a cylindrical surface of a machine part supported in the bearing bushing. An auxiliary seal is located between the open end of the bearing bushing and a shoulder of the machine part. The auxiliary seal has a ring-shaped collar extending in the axial direction, by which it is connected to the bearing bushing and at least one sealing lip bearing against the bearing bushing. The ring-shaped collar is pretensioned with radial pretension. The auxiliary seal has axially oriented projections located in a ring-shaped recess on the side facing the bearing bushing and each projection is situated over a portion of its length on a tongue of the ring-shaped collar.

3 Claims, 2 Drawing Sheets

SEAL FOR BEARING BUSHINGS

FIELD OF THE INVENTION

The present invention relates to seals for bearing bushings particularly universal joints.

BACKGROUND OF THE INVENTION

Seals of the type to which the present invention relate are not new per se. Typically these seals are mounted in the bore of the bearing housing and have a sealing surface which rests against a cylindrical surface of the machine part supported in the bearing bushing and an auxiliary sealing element disposed between the open end of the bearing bushing and a shoulder of the machine part mounted therein. A seal of this general type is shown, for example, in West German Patent No. 2,908,713. The seal illustrated in this patent tends to expand conically when it is pressed onto a shoulder of the machine part supported in the bearing and thus, the sealing action of the sealing lip resting against the bearing decreases.

SUMMARY OF THE INVENTION

With the foregoing in mind, it is an object of the present invention to provide a seal for bearing bushings of the type described above which is characterized by novel features of construction and arrangement so that it is capable of being mounted easily and which ensures a superior sealing action. To this end, the seal of the present invention includes an auxiliary sealing element having axially directed projections formed in a ring shaped recess on the side of the seal facing the bearing bushing. The auxiliary seal has a ring-shaped axially projecting collar. The projections are situated over a portion of their length on a tongue of the ring-shaped collar. This arrangement prevents deformation of the auxiliary seal when it is pushed onto the shoulder of the machine part supported in the bearing.

In accordance with another feature of the present invention, the projections have radially oriented surfaces which upon assembly of the bearing bushing bear against an end surface of the inner sealing ring thereby facilitating insertion during assembly.

BRIEF DESCRIPTION OF THE DRAWINGS

These and other objects of the present invention and the various features and details of the operation and construction thereof are hereinafter more fully set forth with reference to the accompanying drawings, wherein.

DETAILED DESCRIPTION OF THE PREFERRED EMBODIMENT

Figure 1:
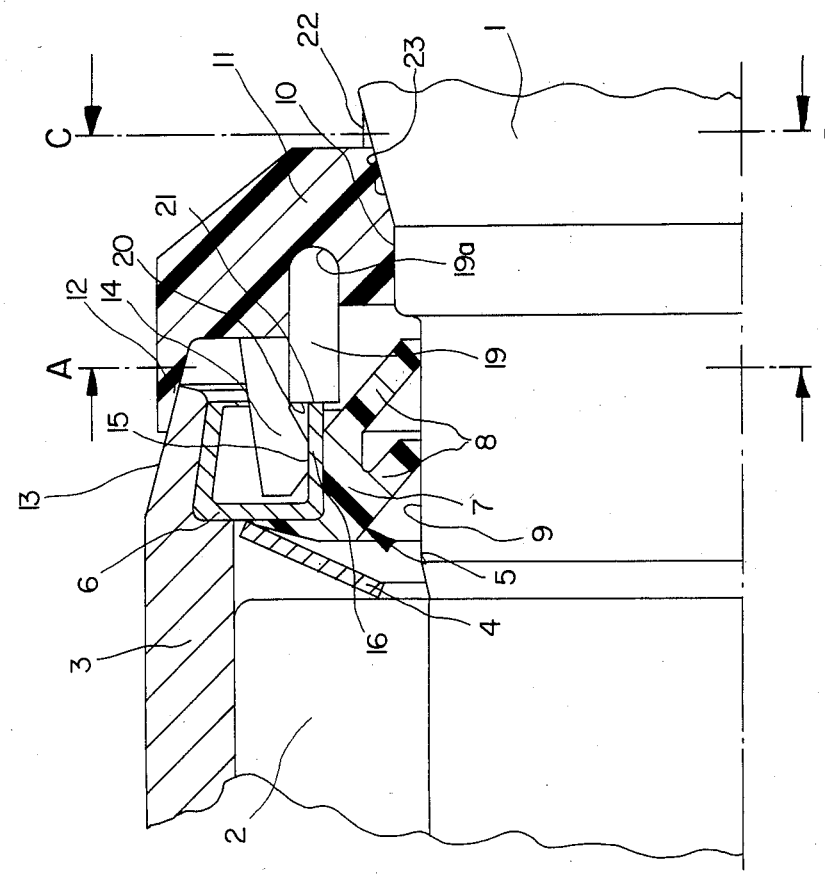
FIG. 1 is a longitudinal sectional view through a bearing bushing with an auxiliary seal assembly made in accordance with the present invention.
Figure 2:
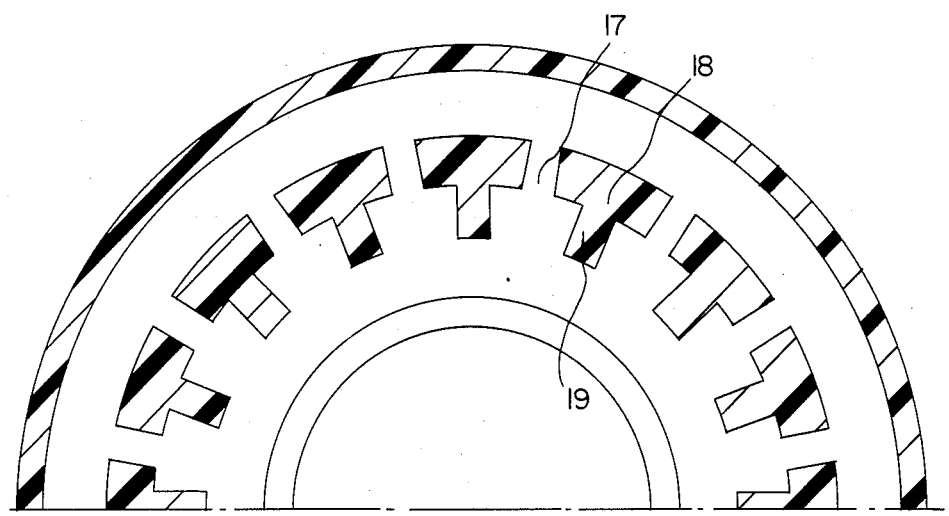
FIG. 2 is an enlarged sectional view taken on lines A-B of FIG. 1.
Figure 3:
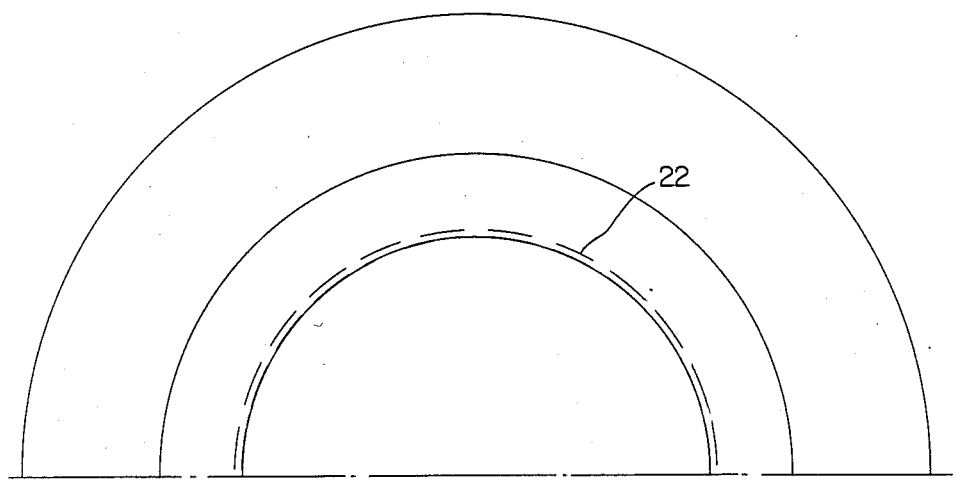
FIG. 3 is a sectional view taken on line C-D of FIG. 1 showing other details of the auxiliary seal of the present invention.

Referring now to the drawing, there is illustrated a universal joint pin 1 supported in the eye of a fork (not shown) by a plurality of cylindrical rollers 2 and a bearing bushing 3. As illustrated, the cylindrical rollers 2 are supported at the base of the bearing bushing 3 by a cup spring 4 which is supported axially against the sealing ring 5. Sealing ring 5 comprises a sheet metal part 6 of U-shaped cross section mounted in the bore of the bearing bushing 3 to which a sealing element 7 is secured by vulcanization. The sealing element 7 includes a pair of angled sealing lips 8 which rests on a cylindrical shoulder 9 of the universal pin 1.

An auxiliary seal 11 is mounted between the open end of the bearing bushing 3 and a shoulder 10 of universal joint pin 1. The auxiliary seal has a ring-shaped sealing lip 12 which bears against a radially inwardly slanted lateral surface 13 of bearing bushing 3. A ring-shaped collar 14 extends axially from a face of the auxiliary seal 11 and rests with radial pretension against an annular surface 15 of one of the shanks 16 of sheet metal parts 6. Ring-shaped collar 14 has several radially extending through slots 17 located about its periphery forming tongues 18 which facilitate easy connection to the bearing bushing 3. The proper axial position of the auxiliary seal is determined by a plurality of axially directed projections 19 which in the final assembled position bear with radial surfaces 20 against end surface 21 of inner axially oriented shank 16 of sheet metal parts 6. Means is provided for stiffening the auxiliary seal 11 comprising in the present instance a plurality of projections 19 located in ring-shaped recess 19a which projections are connected over part of their length to a tongue 18. Thus, when auxiliary seal 11 is installed on shoulder 10 of unviversal joint pin 1, seal 11 will not expand conically and thus, the ring-shaped sealing lip 12 always bears with a predetermined pretension against lateral surface 13 of bearing bushing 3. The axially oriented projections 19 are of a predetermined configuration and location so that they serve as insertion guides for the installation of auxiliary seal on universal joint pin 1. It is noted that the frictional engagement between projections 19 and axially oriented shank 16 of sheet metal parts 6 resulting from relative movement between the shank 16 and auxiliary seal during operation diminishes rapidly in the early use cycle since the material near the contact surface 20 is worn away after a short period of operation. Several projections 22 are provided on the side 11b of auxiliary seal 11 facing away from the bearing bushing 3. These projections 22 are circumferentially spaced about the periphery of the auxiliary seal 11 and are flexible in a radial direction. These projections 22 rest with radial pretension against a conical lateral surface 23 of universal joint pin 1 and serve to reinforce the torsion proofing between universal joint pin 1 and auxiliary seal 11.

Even though a particular embodiment of the invention has been illustrated and described herein, it is not intended to limit the invention and changes and modifications may be made therein within the scope of the following claims.

What is claimed is:

1. Seal for bearing bushing comprising a sealing ring in a bore of the bearing bushing having a sealing surface which rests against a cylindrical surface of a machine part supported in the bearing bushing, an auxiliary seal located between the open end of the bearing bushing and a shoulder of the machine part, said auxiliary seal having a ring-shaped collar extending in the axial direction by which it is connected to the bearing bushing and at least one sealing lip engaging the bearing bushing, means pretensioning the ring-shaped collar with radial pretension, said auxiliary seal (11) having axially oriented projections (19) located in a ring-shaped recess (19a) on the side facing the bearing bushing (3), each projection being situated over a portion of its length on tongue (18) of the ring-shaped collar (14).

2. Seal for bearing bushing according to claim 1, wherein the projection (19) is provided with a radially oriented surface (20), which, on assembly of the bearing bushing (3), rests against the end surface (21) of the sealing ring (5).

3. Sealing for bearing bushing according to claim 1, wherein including several projections (22) on the side of said annular seal (11) facing away from the bearing bushing in the area of the bore, which are distributed around the periphery and which are elastic in the radial direction, said projections (22) resting with pretension against a lateral surface (23) of the machine part (1) supported in the bearing bushing (3).

* * * * *